United States Patent
Beyleveld et al.

[15] 3,697,562
[45] Oct. 10, 1972

[54] NOVEL FLUOROCARBON DIAMIDES
[72] Inventors: Wilhelmus M. Beyleveld, Whippany; Bryce C. Oxenrider, Florham Park; Cyril Woolf, Morristown, all of N.J.
[73] Assignee: Allied Chemical Corporation, New York, N.Y.
[22] Filed: Oct. 17, 1969
[21] Appl. No.: 867,373

[52] U.S. Cl.........260/404.5, 260/518 A, 260/558 D, 260/558 R, 260/561 K, 260/561 R, 260/562 B, 106/2
[51] Int. Cl.............................................C07c 103/30
[58] Field of Search................260/561 K, 518 A, 260/558 D, 558 P, 558 R, 561 R, 562 B

[56] References Cited

UNITED STATES PATENTS

| | | |
|---|---|---|
| 3,141,758 | 7/1964 | Hamm et al.........260/561 HL |
| 3,555,056 | 1/1971 | Crescentini et al.....260/404.5 |

*Primary Examiner*—Lewis Gotts
*Assistant Examiner*—Ethel G. Love
*Attorney*—Arthur J. Plantamura and Stanley M. Teigland

[57] ABSTRACT

Novel fluorocarbon diamides useful as oil- and water-repellent agents have the formula

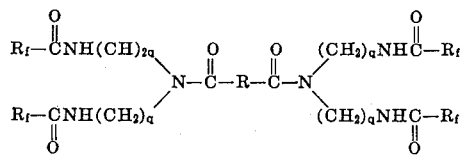

wherein R is a covalent bond, an alkyl diradical of one to 12 carbon atoms, an alkylene diradical of two to 12 carbon atoms, a phenyl diradical having from zero to four chlorine substituents, or a dicarboxy phenyl diradical having the formula

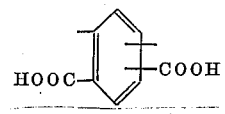

; $q$ is an integer from 1 to 6; and $R_f$ is a radical having the formula $$Y(CF_2)_s(CH_2)_t—$$

wherein $s$ is an integer from 1 to 16, $t$ is an integer not greater than $s$ from 0 to 8, with the sum of $s$ plus $t$ being from 1 to 20; and Y is selected from the group consisting of $F_3C—$ and radicals having the formula

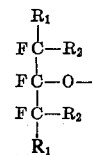

wherein $R_1$ and $R_2$ are fluorine or perfluoroalkyl groups having from one to nine carbon atoms, with not more than three of the $R_1$ and $R_2$ groups being perfluoroalkyl groups.

10 Claims, No Drawings

NOVEL FLUOROCARBON DIAMIDES

BACKGROUND OF THE INVENTION

This invention relates to novel fluorocarbon derivatives useful as oil- and water-repellent agents.

Compounds having the formula

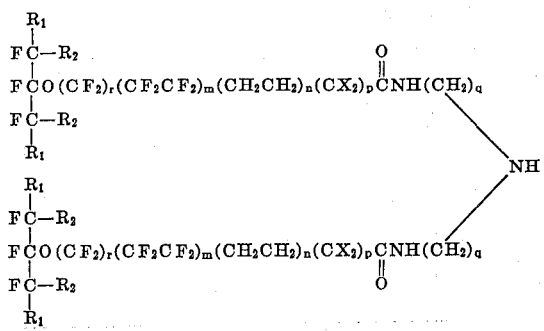

wherein i. $R_1$ and $R_2$ are fluorine or fluoroalkyl groups, or, when taken together, are fluoroalkylene groups forming a cycloaliphatic structure, the $R_1$ and $R_2$ groups each having from one to nine carbon atoms, with not more than three of the $R_1$ and $R_2$ groups being fluoroalkyl groups, ii. $m$ and $n$ are each integers of from 0 to 20, with the proviso that the sum of $m$ plus $n$ is from 0 to 20, and provided further that when $r$ is 0, $m$ is at least 1, iii. X is selected from the group consisting of hydrogen and fluorine, with the proviso that when $n$ is greater than 0, then X is always hydrogen, iv. $p$ is 0 or 1, v. $r$ is 0 or 1, with the proviso that when the sum of $m$, $n$ and $p$ is greater than 0, then $r$ is always 0, and vi. $q$ is an integer from 1 to 6 are disclosed in U.S. Pat. No. 3,576,019. The compounds are described in said patent as being useful to impart oil repellency to textile materials. Said patent further recites that the compounds are applied to the material to be rendered oil repellent by treating the material with a solution of the compound and evaporating the solvent. The treated material is then normally cured or "heat-set" at elevated temperatures.

An improved method of imparting oil repellency to textile materials is disclosed in U.S. Pat. No. 3,646,153. That patent discloses compositions of synthetic resins having incorporated therein an additive which imparts oil- and water-repellency directly to fibers extruded from the composition. The additives which are suitable for use in the invention of U.S. Pat. No. 3,646,153 must meet certain stringent requirements in addition to being capable of imparting oil and water repellency to the extruded fiber. The additives must be thermally stable and nonfugitive at the temperature at which the fibers are extruded. A further requirement is that the additive must be dispersible in the resin to which it is added. In developing the invention of U.S. Pat. No. 3,646,153, it was found that the compounds of U.S. Pat. No. 3,576,019 generally do not meet these requirements and hence are not suitable for use in the invention of U.S. Pat. No. 3,646,153.

It is an object of this invention to provide derivatives of the compounds of U.S. Pat. No. 3,576,019 suitable for use in the invention of U.S. Pat. No. 3,646,153. It is a further object of this invention to provide such derivatives which are suitable for use as conventional oil-repellent agents.

SUMMARY OF THE INVENTION

This invention provides a class of novel fluorocarbon compounds having the formula

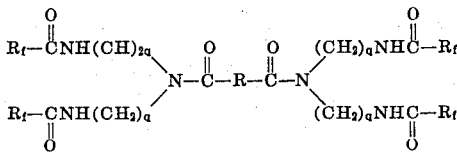

wherein R is a covalent bond, an alkyl diradical of one to 12 carbon atoms, an alkylene diradical of two to 12 carbon atoms, a phenyl diradical having from zero to four chlorine substituents, or a dicarboxy phenyl diradical having the formula

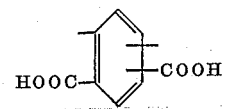

$q$ is an integer from 1 to 6; and $R_f$ is a radical having the formula $$Y(CF_2)_s(CH_2)_t-$$

wherein $s$ is an integer from 1 to 16, $t$ is an integer not greater than $s$ from 0 to 8, with the sum of $s$ plus $t$ being from 1 to 20; and Y is selected from the group consisting of $F_3C-$ and radicals having the formula

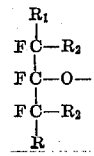

wherein $R_1$ and $R_2$ are fluorine or perfluoroakyl groups having from one to nine carbon atoms, provided that not more than three of the $R_1$ and $R_2$ groups are perfluoroalkyl groups. $R_1$ and $R_2$ together can form a cycloaliphatic structure.

As oil-repellent agents, the compounds of this invention have certain advantages over oil-repellent agents known to the art and, in particular, over the triazaalkane compounds from which the compounds of this invention are derived. Having over twice the molecular weight of the triazaalkane compounds, the compounds of this invention are less volatile and in general are otherwise more thermally stable than the corresponding triaza compounds. More importantly, however, the compounds of this invention are characterized in having four perfluoroalkyl groups pendant from an organic radical. The organic radical serves to enhance the compatibility of the compound with the substrate to which it is applied without detracting from the oil-repellency provided by the perfluoroalkyl groups. For example, fluoroalkyl groups are notoriously repellent in nature, but this repellency, which is valuable in imparting oil-repellency to a system, must be compensated for in order to incorporate the fluoroalkyl groups into the system. The nonfluoroalkyl portion of the molecule of the compounds of this invention, which forms the nucleus of the molecule, serves to orient the molecule in the substrate while leaving the four fluoroalkyl "-tails" free to extend from the surface of the substrate and perform their function of repellency. This feature of the compounds of this invention makes them especially valuable as additives which can be incorporated directly into a synthetic resin, which can then be extruded as a fiber having oil- and water-repellency. By this method, the additive is incorporated into the resin in conventional manner, i.e., either by dry or melt blending, in an amount of about 1 percent, followed by extrusion of the resin into filament in accordance with conventional methods. The triazaalkane compounds from which the compounds of this invention are derived are generally not suitable for use in this method of imparting oil repellency to synthetic fibers.

The compounds of this invention can also be employed as conventional oil and water repellents and as such can be applied to substrates in accordance with known methods.

The compounds of this invention are prepared by reacting a triazaalkane having the formula

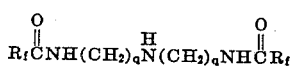

wherein $R_f$ and q have the meanings given for the compounds of this invention, with a diacid chloride having the formula

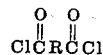

wherein R has the afore-stated meaning, with the exception that R is not a dicarboxy phenyl diradical having the formula

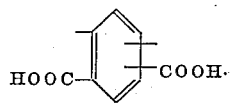

In order to prepare the compounds of this invention wherein R is this particular phenyl diradical, pyromellitic anhydride is used as the reactant in place of a diacid chloride, as is illustrated in Example 10.

The reaction is carried out in any solvent which is capable of dissolving the reactants and which is inert with respect to the reactants and the product. Most customarily employed organic solvents, such as acetone, are suitable. The reaction can be carried out at temperatures ranging from room temperature up to 200° C., preferably from room temperature to 100° C. Lower temperatures can be used if desired.

When a diacid chloride is used as a reactant, it is desirable to add to the reaction mixture an organic base which forms an insoluble salt with the HCl which is liberated as a byproduct. Triethylamine is particularly suitable as such an organic base.

The diacid chloride reactants are well known materials. The triaza reactants are readily prepared by reacting a lower alkyl ester of an acid having the formula $R_f$-COOH with an amine having the formula $NH_2(CH_2)_q NH(CH_2)_q H_2$, wherein $R_f$ and q have the meanings given for the compounds of this invention. Esters derived from acids having the formula $R_f COOH$ wherein the "Y" group of the $R_f$ component is $F_3C-$ are well known materials and can be made from the acids, which are generally available commercially. Acids wherein "Y" has the formula

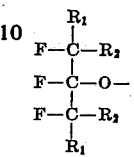

can be prepared from a telomer halide having the formula

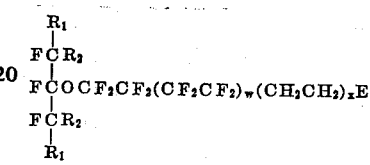

wherein $R_1$ and $R_2$ have the afore-stated meanings, w and x are integers indicating the respective degrees of telomerization, and E is bromine or iodine. These telomer halides and their method of preparation are described in U.S. Pat. No. 3,514,487. The telomer halides are prepared by reacting telogens of the formula

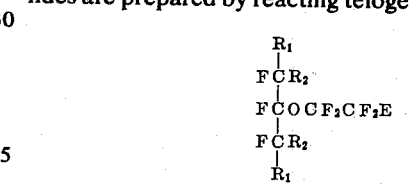

with telomerizable unsaturated compounds, i.e., tetrafluoroethylene and ethylene, the reaction being initiated by heat or free radical catalyst. The telogens are prepared by reacting the corresponding perfluorinated ketone with an ionizable fluoride salt, e.g. CsF, to form the corresponding organic salt, and then reacting the organic salt with tetrafluoroethylene and either bromine or iodine. Preparation of the telogens is described in greater detail in U.S. Pat. No. 3,453,333.

Acids having the formula

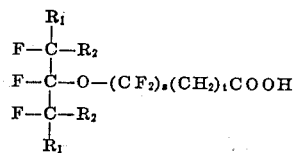

wherein $t$ is 0 can be prepared by reacting the corresponding telomer halide with ICN or $(CN)_2$ at pressures above 20 atmospheres and at temperatures above 300° C. to form the nitrile, followed by hydrolysis of the nitrile in accordance with conventional methods to form the acid. Acids wherein t is greater than zero can be prepared by reacting the corresponding telomer halide with an alkali metal cyanide in the presence of dimethyl sulfoxide at temperatures between 60° and 100° C. to form the nitrile, from which the acid can be prepared in accordance with conventional methods. The acid can also be prepared (regardless of whether $t$ is 0 or greater) by reacting the telomer halide with sulfur trioxide, followed by hydrolysis of the reaction product to obtain the acid. By this method, the acid contains one less carbon atom than the telomer halide from which it was prepared. Also, the acid thus formed can be converted to the corresponding telomer iodide for further telomerization by reaction with alkali-free silver oxide to form the silver salt, followed by reaction of the silver salt with powdered iodine to form the telomer iodide. By this method, acids having either an odd or even number of hydrocarbyl or fluorocarbyl groups can be prepared.

DESCRIPTION OF THE PREFERRED EMBODIMENTS

The preferred compounds of this invention have the formula

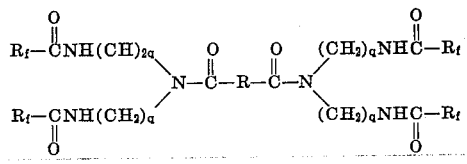

wherein R is a covalent bond, an alkyl diradical of one to eight carbon atoms, a phenyl diradical having from zero to four chlorine substituents, or a dicarboxy phenyl diradical having the formula

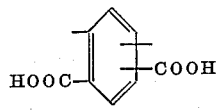

$q$ is 2; and $R_f$ is a radical having the formula $$Y(CF_2)_s(CH_2)_t—$$

wherein $s$ is an integer from 2 to 10; $t$ is an integer not greater than s from 0 to 4; and Y is selected from the group consisting of $F_3C—$ and radicals having the formula

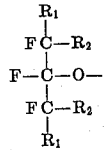

wherein $R_1$ and $R_2$ are fluorine or perfluoroalkyl groups having from one to two carbon atoms. In especially preferred embodiments of this invention, $R_1$ and $R_2$ are fluorine, $s$ is 2 to 5, and $t$ is 0 to 2.

The following examples further illustrate the invention. In each example the product was identified by elemental and infrared spectrum analyses.

EXAMPLE 1

To a flask containing 100 ml of acetone, 12.1 grams triethylamine and 82.7 grams of the compound

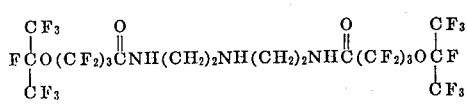

there was added dropwise over a period of 27 minutes a solution of 10.2 grams isophthalyl chloride in 100 ml acetone. The reaction mixture was maintained at a temperature between 44° and 57° C. for two hours, allowed to stand overnight, heated at reflux (57° C.) for 30 minutes, chilled to 5° C. and then filtered to remove the by-product triethylamine hydrochloride. The filtrate was heated to remove the acetone. Water was added to the residue, which on heating produced a milky slurry, which was filtered. The cake dissolved in ethanol on heating. A total of 68.7 grams of product, melting point 139°–140° C., were obtained by crystallization from ethanol. The product was identified as having the chemical structure

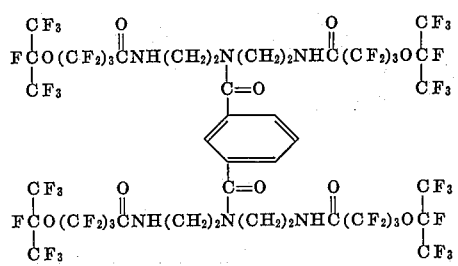

EXAMPLE 2

To a flask containing 100 ml of acetone, 8.3 ml of triethylamine and 27 grams of 1,7-bis(perfluorooctanoyl)-1,4,7-triazaheptane, which has the formula there was added a solution of 3.05 grams of isophthalyl chloride in 50 ml of acetone. The reaction mixture was initially clear, but a precipitate began to form after a few seconds. The mixture was stirred at room temperature for 2 hours, heated to between 50° and 55° C. for 1 hour, cooled to room temperature and filtered. The cake was dissolved in warm ethanol. A total of 21.9 grams of product, melting point 184°–185° C., were obtained by crystallization from ethanol. The product had the following chemical structure

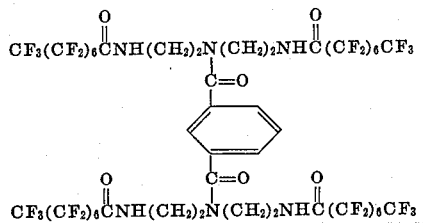

Squares of nylon cloth were dipped into a solution of 1 percent by weight of the product in acetone. After drying, the treated cloths had a surface energy of 18 dynes/cm. whereas untreated cloths (control) had a surface energy of 43 dynes/cm. The surface energy of a cloth reflects its ability to repel oil- and water-borne stains. For example, the treated cloths exhibited superior resistance to staining by alcohol, corn oil, corn syrup and French dressing.

The product itself had a surface energy of 12.2 dynes/cm.

EXAMPLE 3

To a flask containing a solution of 26 grams of 1,7-bis(perfluorooctanoyl)-1,4,7-triazaheptane and 8.3 ml of triethylamine in 150 ml of acetone, there was added a solution of 6.65 grams of tetrachlorophthaloyl chloride in 50 ml of acetone. The reaction mixture was stirred at room temperature for 3.5 hours, heated to 50° C. for 2 hours, and filtered. The filter cake was heated with 100 ml ethanol, cooled, and filtered. A total of 11.9 grams of product, melting point 180° C., were recovered by crystallization from ethanol. The product was identified as 1,7-bis(perfluorooctanoyl)-1,4,7-triazaheptane tetrachlorophthalamide and had a surface energy of 14.6 dynes/cm.

EXAMPLE 4

To a flask containing 8.3 ml of triethylamine, 27 grams of 1,7-bis(perfluorooctanoyl)-1,4,7-triazaheptane and 150 ml of ethyl ether, there was added a solution of 1.3 ml of oxalyl chloride in 50 ml of ethyl ether over a period of 20 minutes. A gelatinous mass formed which was heated to reflux with water, which broke the gel. The mixture was heated at reflux for 30 minutes, then filtered. The filter cake was washed with hot water and then extracted with 500 ml of ethanol. Evaporation of the ethanol yielded 6.6 grams of a yellow-brown solid which was boiled in acetone, which dissolved the colored material, leaving a white, insoluble portion which was recovered by filtration. The white portion, melting point 185° C., was identified as having the structure

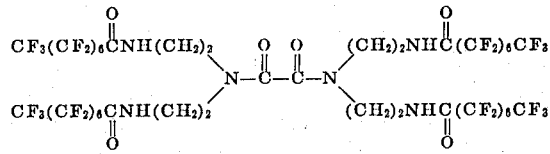

EXAMPLE 5

The general procedure of Example 2 was followed except 3.6 grams of sebacoyl chloride were substituted for tetraphthaloyl chloride. There was obtained 22 grams of 1,7-bis(perfluorooctanoyl)-1,4,7-triazaheptane sebacamide, melting point 163°–165° C.

EXAMPLE 6

To a flask containing 27 grams 1,7-bis(perfluorooctanoyl)-1,4,7-triazaheptane, 150 ml of acetone and 8 ml of triethylamine, there was added 2.3 grams of succinyl chloride over a period of 18 minutes. The reaction mixture was stirred at room temperature for 1 hour, then at 45°–50° C. for 30 minutes. After cooling, the mixture was filtered. The filter cake was washed with acetone, ethanol and hot water and was substantially insoluble in all three. The cake was then heated in a solution of 100 ml of water, 2 grams of sodium hydroxide and 75 ml of methanol. The mixture was filtered and the filter cake was washed with water and extracted with 100 ml each of hot acetone, methanol and glacial acetic acid. After evaporation, there was obtained 11.5 grams of product, melting point 192°–195° C., which was identified as 1,7-bis(perfluorooctanoyl)-1,4,7-triazaheptane succinamide.

EXAMPLE 7

To a flask containing 17.9 grams of 1,7-bis(perfluorooctanoyl)-1,4,7-triazaheptane, 8 ml of triethylamine and 200 ml of anhydrous acetone, there was added 1.83 grams of adipyl chloride in 50 ml of acetone. The reaction mixture was stirred at room temperature for 3 hours, then filtered. The filter cake was then heated with ethanol and filtered. Upon drying the filter cake, there was obtained 15.2 grams of product, melting point 190°–195° C., which was identified as 1,7-bis(perfluorooctanoyl)-1,4,7-triazaheptane adipamide. The product had a surface energy of 11–13 dynes/cm.

A solution of 1 percent by weight of the product in hexafluoroisopropanol was prepared. Certain areas of a paper towel were wetted with solution and allowed to dry at room temperature. The treated areas were repellent to water droplets and to heptane droplets. After being exposed to a steady stream of water from a tap, the treated areas remained opaque and dry.

A cotton cloth was saturated with the solution, blotted on paper towels, air dried, heat set at 150° C., and ironed. The treated cloth repelled oil and water.

EXAMPLE 8

By a method analogous to that of Example 1, 13.0 grams of 1,7-bis(perfluoroisopropoxyhexanoyl)-1,4,7-triazaheptane were reacted with 1.25 grams of isophthalyl chloride to produce 7.7 grams of 1,7-bis(perfluoroisopropoxyhexanoyl)-1,4,7-triazaheptane isophthalamide, melting point 172° C.

EXAMPLE 9

To a flask containing a solution of 6.9 grams of the compound [(CF$_3$)$_2$CFO(CF$_2$)$_2$(CH$_2$)$_2$CONH(CH$_2$)$_2$]$_2$NH in 50 ml of dyglyme, there was added 0.89 gram of isophthalyl chloride and 1.13 gram of triethylamine. The reaction mixture was gradually heated over a period of 4 hours to a temperature of 137° C. After cooling, the mixture was filtered to remove triethylamine hydrochloride. The filtrate was heated to remove the solvent and the residue was dissolved in methanol. The addition of water produced a milky precipitate which was recovered by filtration. After drying, there was obtained 2.35 grams of product which was identified as [(CF$_3$)$_2$CFO(CF$_2$)$_2$(CH$_2$)$_2$CONH(CH$_2$)$_2$]$_2$NCOC$_6$H$_4$CON[(CH$_2$)$_2$NHCO(CH$_2$)$_2$(CF$_2$)$_2$OCF(CF$_3$)$_2$]$_2$

EXAMPLE 10

To a flask containing a solution of 15.1 grams of 1,7-bis(perfluoroisopropoxybutyryl)-1,4,7-triazaheptane in 100 ml of acetone, there was added a solution of 2.0 grams of pyromellitic anhydride in 50 ml of acetone. The reaction mixture was maintained at 40° C. for 2 hours and heated at reflux for 1 hour. The addition of water produced a gelatinous layer which was recovered by filtration. After drying, there was obtained 9.5 grams of product, melting point 135° C. An additional 6.5 grams of product were recovered from the mother liquor. The product was identified as having the structure

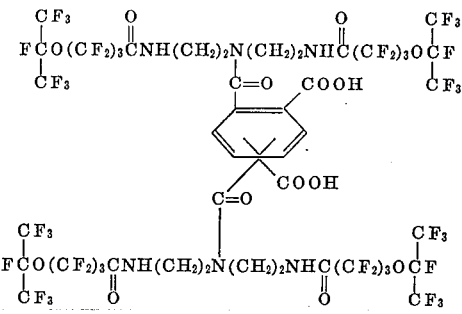

It is not possible to determine whether the two carboxyl groups are meta or para with respect to each other. Most likely, the reaction product is a mixture of the two isomers. Hence, when the symbol

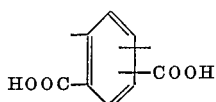

is used to represent the R component of the compounds of this invention, the compounds are understood to be the reaction product of the corresponding triaza compound with pyromellitic anhydride.

We claim:

1. A compound having the formula

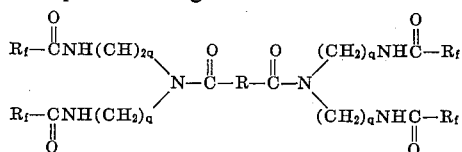

wherein R is a covalent bond, an alkyl diradical of one to 12 carbon atoms, an alkylene diradical of two to 12 carbon atoms, a phenyl diradical having from zero to four chlorine substituents, or a dicarboxy phenyl diradical; having the formula

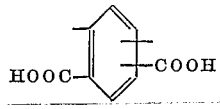

$q$ is an integer from 1 to 6; and $R_f$ is a radical having the formula $$Y(CF_2)_s(CH_2)_t-$$

wherein $s$ is an integer from 1 to 16, $t$ is an integer not greater than $s$ from 0 to 8, with the sum of $s$ plus $t$ being from 1 to 20; and Y is selected from the group consisting of $F_3C-$ and radicals having the formula

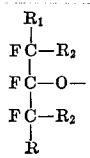

wherein $R_1$ and $R_2$ are fluorine or perfluoroalkyl groups having from one to nine carbon atoms, provided that not more than three of the $R_1$ and $R_2$ groups are perfluoroalkyl groups.

2. The compound of claim 1 wherein R is an alkyl radical of one to eight carbon atoms, a phenyl radical having from zero to four chlorine substituents, or a dicarboxy phenyl diradical having the formula

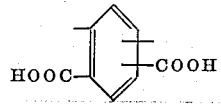

$q$ is 2; $s$ is an integer from 2 to 10; $t$ is an integer not greater than $s$ from 0 to 4; and $R_1$ and $R_2$ are fluorine or perfluoroalkyl groups having from one to two carbon atoms.

3. The compound according to claim 2 wherein $R_f$ is $CF_3(CF_2)B6-$.

4. The compound of claim 2 wherein $R_1$ and $R_2$ are fluorine.

5. The compound of claim 4 wherein $s$ is 2 to 5 and $t$ is 0 to 2.

6. The compound of claim 1 wherein $R_f$ has the formula

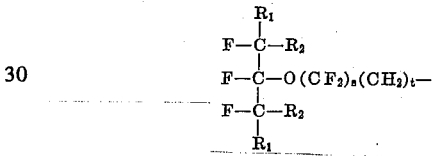

wherein $s$ is an integer from 1 to 16, $t$ is an integer not greater than $s$ from 0 to 8, with the sum of $s$ plus $t$ being from 1 to 20, and $R_1$ and $R_2$ are fluorine or perfluoroalkyl groups each having from one to nine carbon atoms, provided that not more than three of the $R_1$ and $R_2$ groups are perfluoroalkyl groups.

7. The compound of claim 6 wherein R is an alkyl diradical of one to 12 carbon atoms or an alkylene diradical of two to 12 carbon atoms.

8. The compound of claim 7 wherein R is an alkyl diradical of one to eight carbon atoms, $s$ is an integer from 2 to 10, $t$ is an integer not greater than $s$ from 0 to 4, and $R_1$ and $R_2$ are fluorine or perfluoroalkyl groups each having one or two carbon atoms, provided that not more than three of the $R_1$ and $R_2$ groups are perfluoroalkyl groups.

9. The compound of claim 8 wherein R is an alkyl diradical of one to eight carbon atoms, $s$ is an integer from 2 to 5, $t$ is an integer not greater than $s$ from 0 to 2, $q$ is 2, and $R_1$ and $R_2$ are fluorine.

10. The compound of claim 9 wherein R is an alkyl diradical of 4 carbon atoms, $s$ is 3 and $t$ is 0.

* * * * *